May 7, 1963 W. C. MILLIGAN 3,089,079
METHOD AND APPARATUS FOR ELECTRICAL POWER GENERATION
Filed Dec. 2, 1958 5 Sheets-Sheet 1
PRIOR ART
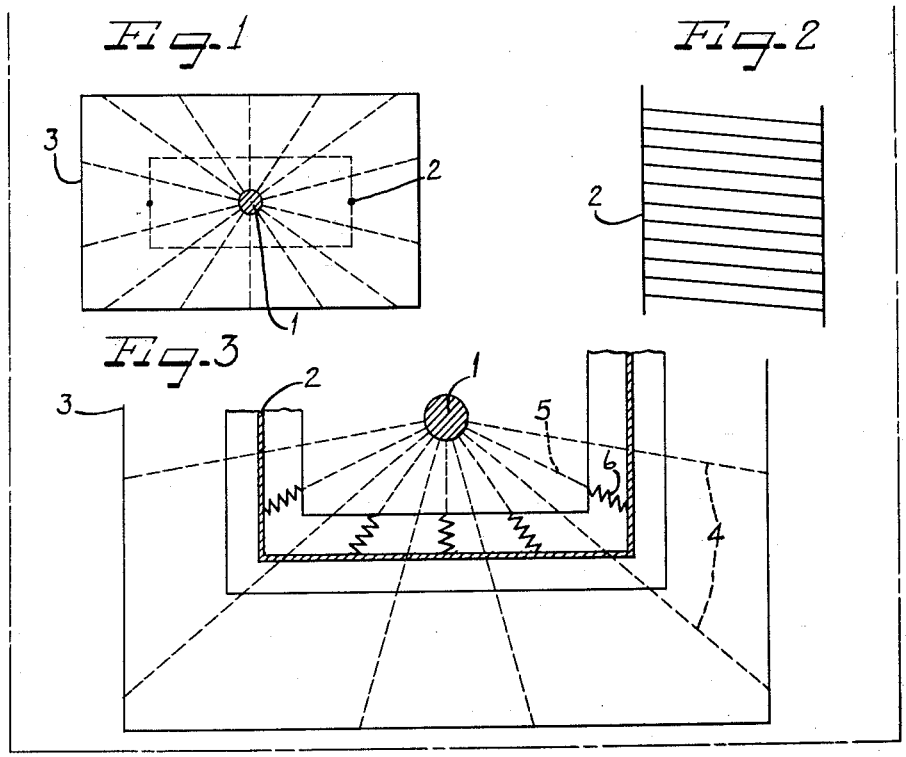
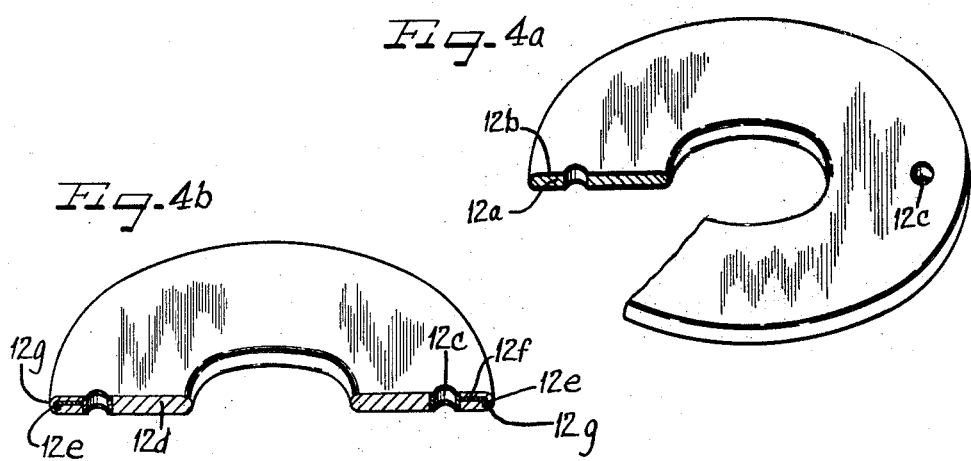
Inventor
William C. Milligan May 7, 1963 W. C. MILLIGAN 3,089,079
METHOD AND APPARATUS FOR ELECTRICAL POWER GENERATION
Filed Dec. 2, 1958 5 Sheets-Sheet 2
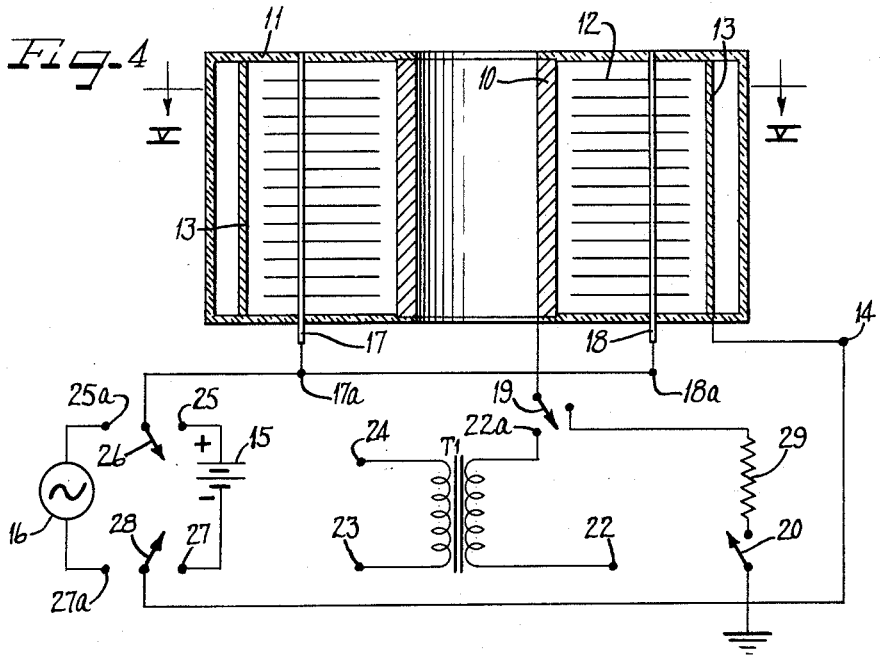
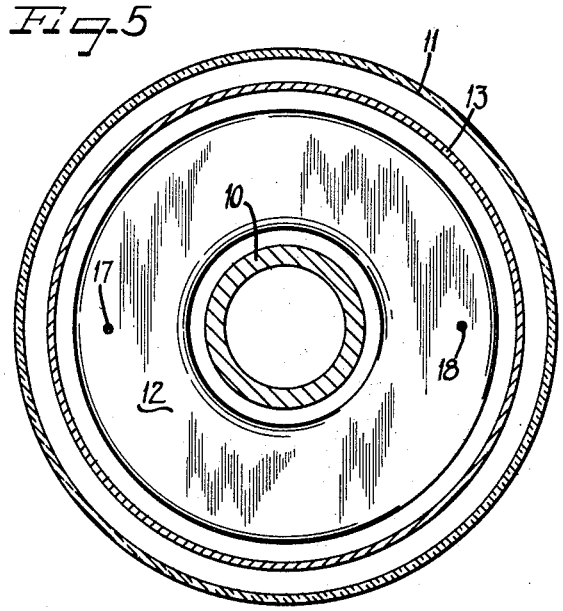
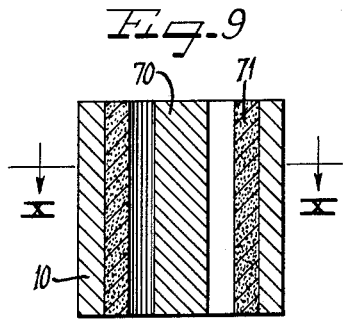
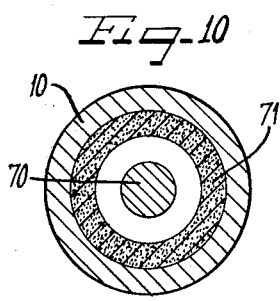
Inventor
William C. Milligan
by Hill, Sherman, Meroni, Gross & Simpson Attys May 7, 1963 W. C. MILLIGAN 3,089,079
METHOD AND APPARATUS FOR ELECTRICAL POWER GENERATION
Filed Dec. 2, 1958 5 Sheets-Sheet 3

*Inventor*
William C. Milligan
by Hill, Sherman, Meroni, Gross *Attys*

Inventor
William C. Milligan

May 7, 1963 W. C. MILLIGAN 3,089,079
METHOD AND APPARATUS FOR ELECTRICAL POWER GENERATION
Filed Dec. 2, 1958 5 Sheets-Sheet 5
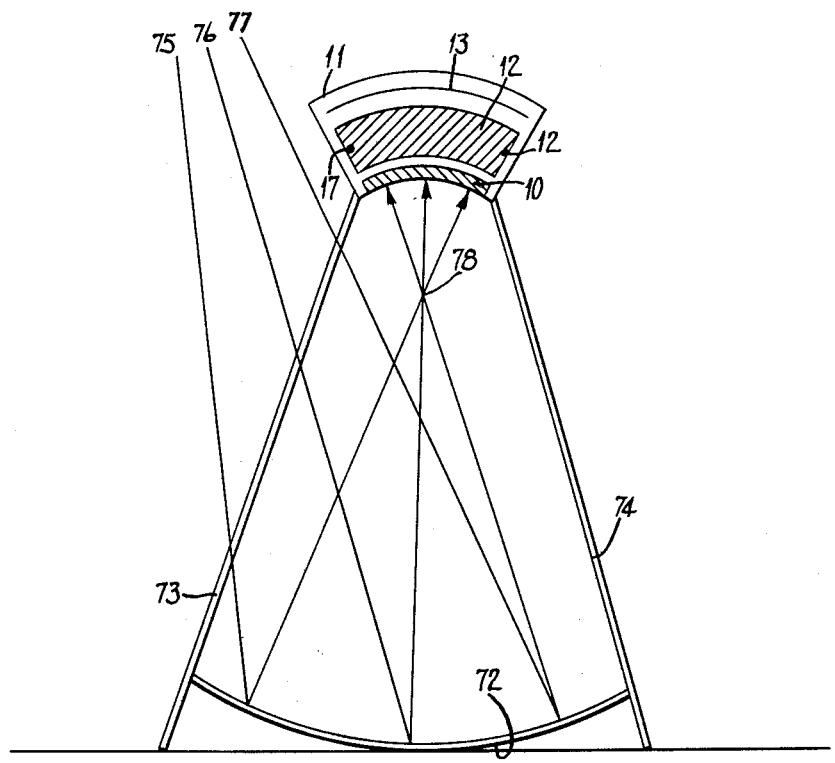
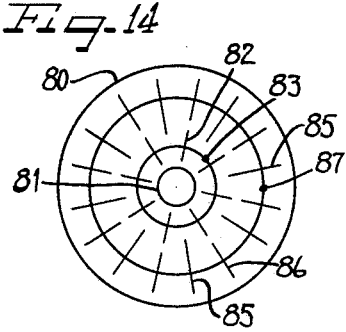
Inventor
William C. Milligan
by Hill, Sherman, Meroni, Gross & Simpson Attys

United States Patent Office 3,089,079
Patented May 7, 1963

3,089,079
METHOD AND APPARATUS FOR ELECTRICAL
POWER GENERATION
William C. Milligan, 1618 San Angelo Blvd.,
San Antonio, Tex.
Filed Dec. 2, 1958, Ser. No. 777,750
21 Claims. (Cl. 322—2)

This invention relates to an electron discharge device particularly adapted for use in a method and apparatus for generating electrical power by the efficient direct conversion of thermal energy to electrical energy. More particularly, the present invention relates to an electrical thermionic converter of the type having an electron accelerator grid and an anode to receive electrons from a heated cathode which converter in conjunction with the proper circuits is adapted, among other uses, to directly convert heat energy into electrical power with an efficiency greater than 50%.

In the method and apparatus to be disclosed herein, no outside voltage or power supply is required for either the cathode or the anode of the electron discharge device. In practice, the device is capable of high power output with efficiencies ranging from 70 to 90%. Although the main field of application of the electron discharge device is as an efficient electrical generator for directly converting heat to electrical power, it will be understood that the device is also readily adapted for use in many other fields of application in the electrical and electronic arts. Hence, while the application of the electron discharge device to the purpose of electrical power generation will be described in detail herein, it will be understood that such descriptive application is intended by way of illustrative example only and not as a limitation on the possible modes of application of the device. With respect to the illustrative applications to be described, it will be understood that the device can be used over a wide range of electrical power applications to eliminate conventional power supplies.

Innumerable attempts have been made in the past to obtain electrical power directly from heat by some conversion means. Many of these attempts have incorporated the use of thermocouples. However, to date thermocouples are well known to generate electrical power with an efficiency of less than 1%, which makes them impractical for commercial applications on any large scale even when used in multiple units to increase their total power output. Solar batteries, fuel cells, and many other different types of devices have been used in such efforts. Nevertheless, all such attempts so far have resulted in relatively low efficiency as a result of the amount of fuel or heat energy required for the amount of power obtainable. The most efficient means of indirect conversion of heat into electrical energy thus far developed is the steam turbine type of generator which has efficiencies of from approximately 30% to 40%. These types, of course, utilize large rotating machinery. It is also well known that conventional electronic power amplifiers have a maximum theoretical efficiency of 50% even for the amplification of electrical power by electronic means.

A recent development has been in the field of gas-discharge tubes in which a filament is maintained at 2500° F. and the anode or collector at 1250° F. The high temperature filament in combination with cesium produces a positively charged ionized gas which reduces the space charge around the emitter and thereby greatly increases the efficiency of this device over what it would be without the ionized gas. The open circuit voltage of this type of converter is from 2 to 3 volts, and under load it is approximately 2 volts output, which provides sufficient energy to light a small flashlight bulb and to have an efficiency of 8%. Without the special ionized gas, the output from the converter would be from 1½ to 2 volts and would thus generate only a few milliamperes output for useful power. Another type recently announced also uses the thermal energy of a heated cathode to force electrons from a high-temperature surface over to a receiving anode or collector by means of spacing the heated cathode only .001 inch from the collector. This type of construction obviously encounters considerable difficulties in practical application due to the expansion and contraction rates of the metals used at such high temperatures and such close spacing. Also, the device at best has only 12% efficiency.

A still further attempt at the direct conversion of heat energy into electrical power is shown and described in Patent Numbers 1,657,574 and 1,803,184 assigned to the General Electric Company by Louis A. Hazeltine. This invention utilizes parallel rows of cylindrical tubing, each of which has an electron emissive coating material in order for them to serve alternately as cathodes or anodes. There are 5 to 15 such cylindrical electrodes mechanically spaced in series with each other. Metal grid bars are then spaced parallel to each row of cylindrical electrodes to serve as high voltage electron accelerator grids. Since a positive voltage is applied to the accelerator grids during one cycle of alternating voltage in order to accelerate electrons from cathodes to anodes, a very intense magnetic field is required to prevent electrons from reaching the high positive grid structure during the positive voltage half-cycle; otherwise a substantial portion of the curent from the cathodes to the grids would be absorbed and thereby prevent any appreciable current to the anode. Also, in order to obtain the greatest possible acceleration velocity in a given period of time, the grids are of necessity placed quite close to the cathodes or anodes. This, therefore, requires that the magnetic field be of very high intensity in order to prevent electrons from being drawn to the metallic grid structures. One thousand ampere-turns per centimeter is recommended. In addition, in order to obtain considerable power output from numerous cathodes and anodes in a series relation to each other, the magnetic field requirements are still greater than they otherwise might be.

The above type of construction is said to be capable of producing hundreds of kilowatts of power without the external supply of any power to the cathodes or anodes other than a preliminary heating therefor. This is a considerable amount of power to be derived from such a means, and particularly is rather unusual in view of the difficulties involved in obtaining real efficiency from such a device since the accelerator grids can serve to operate very effectively only on approximately one-half of the electron path from cathodes to anodes and since from the midway point on, the accelerator grids are required to considerably retard the speed of the electron to prevent overheating the small cathodes and anodes. Nevertheless, such factors are preferred and necessary due to the type of construction used in the Hazeltine device.

Further, in order to obtain reasonable efficiencies and take advantage of self-heating, the cathode areas are necessarily smaller than otherwise would be practical because if too much kinetic energy is imparted to the electron flow between the cathodes and anodes, the anodes would be seriously overheated or be difficult to maintain at a desirable heating point. Therefore, the output voltage is maintained at only 10 volts in order to prevent overheating. However, this seems to be sufficient to obtain enough heat from the cathodes to remain self-heated after a preliminary heating period from some other source. Consequently, thereafter, during normal operation the cathodes supply their own heat for thermal conversion of heat into electricity or power. One of the serious limitations in efficiency of this type of device is that the grids cannot be placed in the direct plane of cathodes-to-anodes in respect to the line of flight of the electrons to the receiver anodes. This would obviously cause excess current requirements of the grids and defeat the purpose intended for the type of grid construction used.

Also, the large power requirement of one thousand ampere-turns per half-inch of air gap indicates that either the cathode and anode dimensions must be kept very small and therefore of low power output or enormous power would be consumed by practical size cathodes and anodes. Further, the high magnetic field requirements may well equal or exceed the output power of the device.

Another disadvantage to the above type of construction would be that the anodes or the alternate means which periodically serve as the anodes, could not survive heavy electron bombardment to their surfaces due to the fact that a coating of calcium oxide or some other emissive type of cathode material was applied to the surfaces. Such a coating cannot withstand the severe electron impact energy possible with a bare metal anode without serious destruction of its emissive surface, and therefore the amount of voltage which can be supplied to the anodes during their normal operation is quite seriously limited. Further, the electrical vector angle from which the positive space charge from the grids can have effective action on the electrons is so far to one side that very poor efficiency in respect to electron acceleration is provided to the electrons in their line of flight to the anodes. Therefore, this type of device requires positive potentials as high as 10,000 volts on the grids.

With the foregoing in mind, an object of the present invention is to provide a novel method and means of converting heat or thermal energy into electrical energy with a conversion efficiency greater than 50% and as high as 70 to 90%.

Another object of the present invention is to provide a simple, rugged and light weight thermionic converter means which does not contain moving parts.

A further object of the present invention is to provide thermionic converters ranging from miniature sizes for low power output to very large sizes for output power well into the kilowatt ranges.

A still further object of the present invention is to provide a thermionic converter means capable of supplying pure direct current or alternating current with a frequency into the megacycle range.

Another and further object of the present invention is to provide a simple and effective self-generating means of supplying electrical power.

Still another object of the present invention is to provide thermionic converters that are inexpensive to construct and which have a long service life and do not require maintenance.

Another and still further object of the present invention is to provide low-cost electrical power conversion means which is small and efficient and therefore has a large number of applications in portable or fixed installations in industry, homes, farms, and the like.

Other objects, features, and advantages of the present invention will be more fully apparent to those skilled in the art from the following detailed description taken in connection with the accompanying drawings in which like reference characters refer to like parts throughout and wherein:

FIGURE 1 is a transverse cross-sectional schematic view of a conventional triode structure of a high vacuum tube with the glass envelope removed wherein a coated grid of the type shown in my previously issued U.S. Patent No. 2,677,070, may be used.

FIGURE 2 is a side view of the wire wound resistance coated grid shown in FIGURE 1.

FIGURE 3 is an enlarged detail transverse cross-sectional schematic view showing a coated grid in the structure of the type shown in FIGURE 1 in conjunction with illustrated electron paths.

FIGURE 4 is a vertical cross-sectional view, partially schematic, of one embodiment of a thermionic converter in accordance with the present invention having annular disk type of grids and showing the proper external connections for use as a generator.

FIGURE 4a is a detailed perspective view, partially broken away, showing one form of annular disk grid suitable for use in the device of FIGURE 4.

FIGURE 4b is a view similar to FIGURE 4a showing a second embodiment of disk grid suitable for use in the device of FIGURE 4.

FIGURE 5 is a cross-sectional view of the thermionic converter taken on the line V—V of FIGURE 4.

FIGURE 9 is a vertical cross-sectional view of a thermionic converter with a catalytic coating to be used in conjunction with a suitable fluid reactive means to heat the cathode by means of catalytic heat of reactions.

FIGURE 10 is a top plan view of FIGURE 9.

FIGURE 11 is a diagrammatic view partly sectional of a solar heating means for heating the cathode of a thermionic converter to generate electrical power.

FIGURES 12 and 13 and FIGURE 14 are schematic illustrations of two alternative embodiments of tube structure.

General Principles and Background

Figure 6:
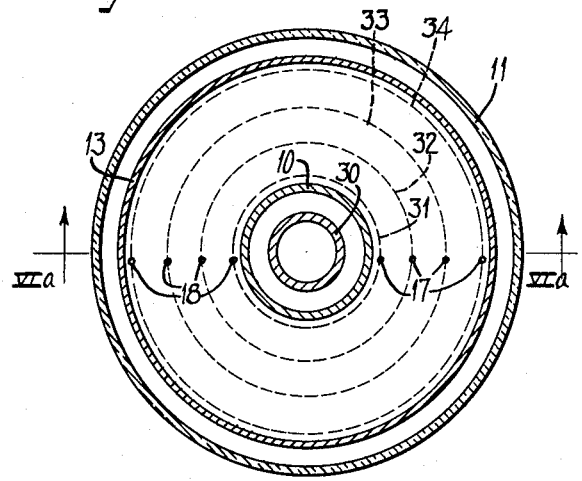
FIGURE 6 is a cross-sectional plan view, partially schematic, of a second embodiment of thermionic converter with multiple grids in conjunction with a central heating system.

In order to clearly understand the nature of this invention it may be desirable to described the construction and operational characteristics of an electronic tube fabricated from principles taught by my prior U.S. Patent No. 2,677,070. A substantially improved version of the electron accelerator means shown therein is used in conjunction with other features to obtain the very high conversion efficiency of heat into electrical power and the control of such power by simple and effective means which are provided by the present invention.

Conventional tube elements were utilized (in my prior device) to construct an electron accelerator device such as illustrated in FIGURE 1 of the drawings herein which shows the cross-sectional relation of the tube elements. The cathode 1 was centrally positioned inside of grid 2 with anode 3 enclosing the cathode 1 and grid 2 in a triode tube arrangement. The conventional type of grid 2 having 40 turns of wire per inch and dimensions of ⅛ x ½ x 1 inch was coated with a resistive coating and was placed within .036 inch of the cathode 1. The top of the grid 2 was constructed as illustrated in FIGURE 1, and the side of grid 2 was constructed as shown in FIGURE 2. The metallic rectangular plate 3 had dimensions of ⅜ x ⅝ x 1 inch and was placed around cathode 1 and grid structure 2. The nearest point of the cathode-to-anode spacing was .161 inch. When the tube was evacuated, the cathode 1 activated and the entire assembly was sealed and tested, the power available at anode 3 of this tube was 44 watts when 100 volts positive was applied to the grid 2 and 400 volts positive applied to anode 3. The same tube used in a conventional manner would have had only 1½ to 3 watts output under the same conditions using beam power grids similar to those of a 35L6, which was altered to build this tube. With the grid grounded, only 6 milliamperes of current could be drawn over to the anode 3 when 400 volts positive potential was applied to the anode 3. However, with 100 volts positive applied to grid 2 and 400 volts positive to anode 3, 110 milliamperes of current could be obtained with coated grid 2 consuming only 300 microamperes. The power consumption required in grid 2 was only 30 milliwatts to completely control 44 watts power to the anode 3.

The high efficiency gained by this type of construction may be better understood if the operational features are considered in the following manner. There were 40 turns of grid wire exposed to each side of the cathode in the grid 2 assembly as shown in FIGURE 2. Therefore, there were, in effect, a total of 80 turns of grid wire capable of influencing cathode 1 and which proportionally divided the total grid current. Thus, the 40 grid wires facing one side of cathode 1 were acting as 40 individual open-ended resistors, and the 40 grid wires facing the other side of cathode 1 were also acting as 40 individual open-ended resistors. For purposes of simplification, therefore, one of the individual turns of the grid on one side of cathode 1 may be considered representative of the action of any one or all of the total turns of wire exposed to cathode 1, as represented in FIGURE 3. Hence, since the 80 individual open-ended resistance paths to the grid wires consumed a total of 300 microamperes to control 44 watts, it is then obvious that one of the open-ended resistance grid wire paths shown in FIGURE 3 would consume a total of only 3.75 microamperes distributed all along its resistance surface to the metal grid underneath.

If the coated grid structure 2 is visualized as having an infinite number of open-ended resistance paths toward cathode 1 with the other end of the resistance paths bonded to the bare metal grid inside of the resistive coating, it may be seen that electrons will flow from cathode 1 to the resistive coating and through the resistive material to the wire grid 2 underneath and then back through a high positive voltage circuit to a common ground to cathode 1. To further understand the high efficiency and the extremely low load current on the surface of the resistive coating on the grid, the 3.75 microamperes of current were distributed all along the circular surface of the coated grid facing the cathode and constituted a distributed current load of approximately 400 microwatts. Therefore, a quarter of the grid surface of the half-turn of grid wire facing cathode 1 would absorb less than 1 microampere of load current. Further, even if 1 microampere of load current, at 100 volts positive, is distributed over one-quarter of said coating, this only involves a load of 100 microwatts. It may then be more obvious that a very minute amount of load current could exist at any one point on the resistive coating, evidently less than 1 microwatt.

This highly efficient grid electron accelerator system, therefore, may also be more easily understood by following the dotted lines coming from cathode 1 over to the anode 3 of FIGURE 3 as being representative of electron flow. The dotted lines 4 illustrate the flow of electrons from cathode 1 over to the anode 3 without touching grid 2. The electron whose path is represented by dotted line 5 and which struck the coated grid surface would therefore penetrate through its surface to the grid wire 2 underneath, in the path shown by the resistance symbol 6. The resistance symbol 6 may also be visualized as one of innumerable resistance paths for electrons whose load at the point of impact is far less than 1 microwatt. These same electron paths and resistance symbols are placed around the circumference and throughout the length shown of the coated grid 2 in this illustration to show how the electrons are distributed along the resistive surface and result in current flow through the high-resistance coating to the wire 2 underneath. It must be remembered that the electron flow is of a free-flight nature to the coated grid 2 and anode 3 and not through a metallic conductor means. Therefore, the electron flow consists of individual tiny particles of electrons striking the surface of the high-resistance coating on grid 2 and the space covered at the instant of impact on coated grid 2 is only that corresponding to the size of the electron particle itself which is, as well known, very minute. Consequently, a number of these electrons can reach the surface and be absorbed as individual particles; and even though coming through in a regular stream, these electrons are so scattered out over the entire surface as to constitute an extremely light load through any part of the high-resistance coating to the bare wire 2 underneath.

Also as is well known, the voltage drop through any type of resistance is proportional to load and to the current-carrying capacity of the resistance material in conjunction with a given applied voltage. As may now be seen from this illustration, the actual load at any point of impact for electrons on the coated grid surface is dependent on the current distribution along the surface of the resistive material to the bare wire 2 underneath. Due to the relatively large area presented for the small amount of electron flow through any portion of the surface of the resistance material, the effective voltage applied to the surface of the coating is, in effect, virtually the same voltage as that applied to the grid wire 2 due to the low voltage drop through the resistance material. As nearly as can be estimated, particularly from the operational characteristics of the tube, the voltage drop from the bare wire 2 to the outer surface is approximately less than 1% of the total positive voltage applied to the bare wire 2 underneath. By such means of construction, in effect, a very high positive electrostatic field is placed very close to cathode 1 and efficiently removes the electrons from the space-charge surrounding cathode 1 and accelerates them at high velocity to and past the resistive-coated grid structure. If a high positive potential is also applied to the anode 3, the electrons will be pulled over with extremely high efficiency to the positive anode 3, even though the distance between anode 3 and the coated grid structure 2 may be substantial in respect to the high internal resistance of a vacuum tube.

A tube constructed as exemplified by FIGURE 1 and with the dimensions given above, however, unlike the device of the present invention, cannot operate effectively as a thermionic converter since only .2 to .5 milliampere output can be obtained over to anode 3 without a positive anode voltage. This is due to the large separation between anode 3 and coated grid 2, with no auxiliary coated grids interposed between coated grid 2 and the anode 3, and for other reasons that will be further explained.

However, I have discovered that if one or more coated grids are properly spaced in relation to the distance between the cathode and the plate and the proper amount of positive voltage is applied to the coated grid plus other important factors to be outlined, a large quantity of electrons can be effectively removed from the cathode and be forced over to an anode in sufficient quantity to overcome any internal tube resistance or external resistance in any circuit connected from the plate to the cathode. This can be done without requiring a positive voltage supply for the anode as in conventional tubes.

The specific requirements essential to practical types of thermionic converters or electronic tubes using the present invention follow. First, a properly designed cathode is required to emit sufficient electrons from its surface to form a dense cloud completely surrounding its surface. Second, a high-resistance coated grid with a sufficiently high positive voltage is used to remove the electrons from the vicinity of the cathode and accelerate them at high velocity toward the anode. One of the reasons for the efficiency of the positive grid is that a departure from the Richardson-Dushman emission equation occurs when the emitting surface is subjected to a strong positive potential gradient. Effectively the positive field reduces the work function. As a result, the current from an emitter increases with the potential applied even though the temperature is kept constant and the emission is not affected by the space charge of the electrons.

The combination of the constant gradient and the normal potential barrier is seen to give a new potential barrier, which has a maximum at a certain distance from the cathode surface. This distance is known as the "critical escape distance" because once an electron gets beyond this distance the electrostatic forces are outward rather than restraining and thus an electron keeps on moving In addition, during any electron acceleration period, the coated grid will attract and absorb a very small fraction of 1% of the total electron flow to the anode when properly designed and constructed.

The total velocity reached while in the acceleration field of the coated grid is quite important for several reasons. The electron is a very dense and highly charged particle. The mass has been estimated to be $9.1066 \times 10^{-31}$ kg.; the negative charge at $1.6020 \times 10^{-19}$ coulomb, and the apparent radius at $1.9 \times 10^{-13}$ cm. Further, the electron has an apparent density of $0.50 \times 10^{11}$ g. per cm.$^3$, which is millions of times greater than that of our heaviest metals (the density of iron is 7.86 g. per cm.$^3$). Also, if the classic concepts of electrostatics be applied to the electron, it may be thought of as being charged to a potential of 750 kilovolts.

It is known that the ratio of the charge to the mass of the electron is so high that a small voltage will impart a tremendous velocity to the electron. It takes only .3 micro-volt to give an electron a velocity of 700 m.p.h., which is approximately the velocity of sound. Although the speeds of electrons are very high, their energy is low because of their minute mass. The electron velocity is a function of the accelerating potential. For voltages up to about 30,000 volts, the velocity is proportional to the square root of potential. Above this voltage relativity considerations apply, with the result that the velocity increases less rapidly and assumes a limiting value equal to the velocity of light. At 3,000,000 volts the electron velocity is 99% of the velocity of light. On a log-log plot it may be seen that velocity follows the half-power law of potential well up to about 100,000 volts. Between 100,000 and 1,000,000 volts the change from the half-power law occurs, and above 1,000,000 volts the velocity is practically constant. An electron reaches one-tenth of the velocity of light at about 2,600 volts. If there were no change of mass with velocity, the electron would reach the velocity of light at about 260,000 volts.

Obviously such ultra-high voltages and electron velocity or changes in mass would not be of practical consideration for any thermionic converter or electronic tube applications except in the narrow fields of linear accelerators, high-voltage electron bombardment of food for preserving purposes, X-ray tubes, etc. However, the figures do show that an electron can be speeded to any desired velocity, almost up to the speed of light. The normal practical values of voltage for the positive grid are in the general range of less than 100 volts to several thousand volts positive. The preferred voltage is dictated by overall design considerations of physical size, power output, acceleration velocity requirements, whether the power generation device is vacuum or gas-filled, etc.

One of the important factors of electron velocity in the present thermionic converter is to move large quantities of electrons from the cathode to the anode with high efficiency and low transit time. In addition it is needed to impart sufficient kinetic energy to the electron to reach what may be called the escape velocity from the retarding influence of the outside diameter of the accelerator grid in order to reach the anode.

When an electron is in an accelerating field its kinetic energy also increases in proportion to its velocity. Obviously, then, the higher the velocity, the higher the kinetic energy involved for a finite mass and the more difficult it will be to slow down or to completely stop a high-velocity particle. Also, since the electron velocity is proportional to the square root of potential, the result is that an electron in the vicinity of the cathode will be accelerated toward the positive field of the accelerator grid at a logarithmic ratio. At the start of the electron movement to the accelerator grid, low kinetic energy is present in the electron mass. Upon reaching high terminal velocity in the accelerating field, proportionally higher kinetic energy has been imparted to the electron mass. When the electron reaches the outer edge of the accelerating field, the kinetic energy is then at maximum. As the electron moves past the outer edge of the accelerating field, any decelerating influence from the grid must also follow the square law effect. Therefore, it is logarithmically lower in respect to the distance the electron travels away from the accelerator grid. Since the kinetic energy of the electron is at minimum as it starts to accelerate and at maximum during deceleration effects, the net result is that for a given applied potential the electron can be accelerated to a far greater extent than it can be decelerated over a given transit distance. Hence, due to the square law effect and to the ratio of kinetic energy involved, a much higher potential would have to be applied as a deceleration field to obtain the same ratio of deceleration of the electron for a given distance the electron would travel.

The conditions assumed above are on the basis of what occurs to a single electron. In actual operation the electron flow consists of billions of electrons at even very small rates of current flow. Therefore, very important effects occur when a large quantity of electrons are flowing and when they are compared to those which occur in respect to one electron. During an appreciable flow of current the acceleration effect is still greater for a given positive potential field due to the strong repulsion effect of the electrons that are following any given quantity of electrons that precede them. Secondly, any electrons flowing past the outer edge of the accelerator grid and into a region of deceleration are subject to very high repulsion fields of numerous electrons which are still in a strong acceleration field. The practical result is that the strong repulsion effects of the electrons in the acceleration field exert a substantial force against the electrons in any deceleration field and thereby provide additional energy for the electrons in the deceleration field to continue on over to the anode. Briefly, therefore, any deceleration force is counter-balanced to an important extent by the repulsion force of the electrons flowing in the same direction and is proportional to the amount of current flow at any instant. The larger the flow of electrons, then, the greater the repulsion force will be. The effect of deceleration fields can also be further reduced by placing the anode sufficiently close to the outer edge of the accelerator grid.

At this point is may be emphasized that it is not intended to imply that the positive potential grid is required to supply power to the electrons to raise their kinetic energy level above that resulting from the escape velocity imparted to them by the thermal energy at the cathode. Any kinetic energy and velocity acquired by the electrons after escaping the cathode will be due solely to the charge of the electron and the magnitude of the positive field of the coated grid. Since a dense cloud of electrons surrounds the cathode surface, it is therefore possible to efficiently attract the outer electrons over to a nearby positive potential field. Further, since the electrons have a high negative charge, they will pull themselves toward any source of positive potential high enough to attract them away from the vicinity of the cathode. In the process of the electrons pulling themselves toward the positive potential grid, no power is required in the grid circuit to assist the electrons to the grid other than that which is required to establish a given positive potential on the grid surface and to absorb any electrons whic may reach the grid and penetrate through the resistive-coating. The energy requirements of the electrons are analogous to a certain extent to those of a permanent magnet which when free to move will pull itself toward a suitable type of metallic objects, as an iron one, at a rate in proportion to the magnetic field output of the magnet and the distance from the metallic object. No actual power is required by the metallic object in order to attract the magnet. In effect, then, the positive field of the grid provides a means which efficiently attracts and supplies a path for the electrons and directs them toward the anode in order to obtain useful power output.

Due to the square law effect in a conventional tube a negative grid will have far more influence on the low-velocity electrons near the cathode for a given negative potential than on the electrons which have gained appreciable velocity away from the cathode and then an attempt is made to retard or to stop their movement. Therefore, it may be seen that the electrons removed from the vicinity of the cathode can be made to reach sufficient velocity and to acquire enough kinetic energy in the acceleration field of the coated grid to overcome any remaining internal resistance in the path between the outside diameter of the grid assembly and the anode. The increased kinetic energy also materially assists in overcoming any plate or external circuit resistance.

It is neither desirable nor necessary that very high electron kinetic energy be used to obtain the major portion of the power output for electrical purposes in the use of the present invention. However, it does serve an important purpose in the generation of electrical power. Excess kinetic energy above that required to complete the transfer of electrons to the anode and to help overcome external circuit resistance or impedance will merely result in a waste of power and be dissipated as excess heat at the anode.

The most efficient portion of the power generation means actually occurs at the cathode in conjunction with the coated grid. The efficient thermal emission action of a modern cathode in conjunction with an efficient means of removing the emitted electrons results in an effective electron sink at the cathode circuit and also results in an attractive force seeking to obtain replacement electrons. The volume of electrons removed from the cathode assembly and circuit results in an equal loss of electrons that must be replaced in respect to those removed from the emissive coating. The provision of a circuit means from the anode back to the cathode can provide a continuous means of returning the electrons, once removed, back to the cathode to keep the process continuous. The return circuit can therefore be utilized to provide output power from the current flow from the anode back to the cathode.

The electron sink effect at the cathode, with the anode at ground potential and the coated grid at a positive potential, will have the following characteristics. If the load resistance between the cathode and anode is approximately 20 kilohms per volt, the cathode has a positive potential equal to that of the positive grid plus 1 to 2 volts additional. The additional voltage of the cathode above that of the grid voltage is due to the thermal emission characteristics of the heated cathode. If the resistance between the cathode and anode is decreased or a power-consuming load is placed between the cathode and anode, the positive potential at the cathode terminal will decrease in proportion to the load, or to the decrease in resistance or impedance between cathode and anode. This proportional reduction in cathode voltage to load is quite important since any reduction in cathode potential in respect to a given positive potential on the grid causes a greater difference of potential between cathode and grid. The positive field of the grid is then proportionally more effective for attracting electrons from the lower potential cathode surface and accelerating them over to the anode. For this reason the higher the load between the anode and cathode, the more efficient the coated grid becomes to provide more power output.

It may now be apparent that to obtain a given positive potential between the cathode and anode or to the ground, it is only necessary that the proper grid voltage in combination with a suitable resistance or impedance circuit between cathode and anode be chosen which will provide the desired amount of voltage and current required for a given power output. To make clear the obvious differences, the output power from the present invention may be compared to that from a rectifier used in a conventional power supply. In the latter instance the anode has a positive potential to remove electrons from the cathode and the cathode has a positive potential lower than that of the anode in proportion to the internal resistance, or space-charge resistance, of the rectifier and the load applied from the cathode to the ground. In the present invention the positive grid eliminates the positive anode voltage requirements, and the positive output voltage available at the cathode is proportional to the grid voltage and the current load from the cathode to the ground.

In order to properly understand another significant factor concerned in the electronic device in accordance with the present invention, it is important to realize that even though no anode voltage from an external source is applied, an effective anode potential actually exists at the anode. For example, even if the anode is connected at a ground potential point as is shown in FIGURE 4 (to be described in detail below), nevertheless, it is electrically connected to the cathode by means of a load connected between terminals 19 and 20 in order for a continuous flow of current to be obtained. Any given loss of electrons from the cathode surface results in an equivalent electron sink in the cathode's crystal lattice; or to state it another way, the cathode is proportionally electro-positive due to the metal ions in the cathode having lost electrons forced by thermal emission to the electron cloud. Providing an electrical connection from the cathode to anode, in turn, provides the same equivalent electron sink at the anode surface that exists at the cathode surface. The total electron sink effect at the cathode and anode is directly proportional to the loss of electrons at the cathode at any instant and the total number of free electrons in space between the cathode and anode at any instant. Hence, during normal operation of the present invention an electron sink will always be present at both the cathode and anode in direct ratio to the number of free electrons thermally supplied from the cathode regardless of how much current is being supplied between the anode and cathode or to the electron cloud surrounding the cathode. The greater the current flow of free electrons from the cathode to anode, the greater the electron sink effect will be at any instant.

Assuming normal electron tube conditions in the present invention, only four conditions would prevent the electron sink effect from occurring in respect to useful power output: (1) If the temperature of the cathode dropped low enough to prevent free electron emission; (2) if the positive potential of the coated grid dropped low enough to no longer assist the flow of electrons to the anode; (The anode would then be too far away from the cathode for thermal emission alone to permit the free electrons to reach the anode.) (3) if the electrical connection between the anode and cathode were removed; and (4) if an equal and opposite flow of current was introduced between the anode and cathode by some external means in the electrical circuit from anode to cathode.

If may therefore be understood that the primary function of the coated grid having a positive potential will be to provide a positive field of attraction for free electrons in the vicinity of the cathode to use their negative charges to pull themselves toward and through the open area of the positive potential field of the grid discs or coated wires and then over to an anode which has an electron sink of sufficient magnitude to freely absorb the total number of electrons reaching its surface. In the process of providing a positive potential in the coated grid to assist the negatively charged electrons to pull themselves away from the cathode, through the positive grid and over to the anode, the electrons will pull themselves over to the anode at a degree of efficiency in proportion to the magnitude of the positive potential applied to the grid and the total external circuit resistance between the anode and cathode. This condition is thus quite similar to the action of gas ions in reducing the space charge resistance surrounding a cathode in a conventional tube or in the present invention and thereby increasing the efficient flow of current from the cathode to anode in proportion to the number of gas ions present at any instant and their total positive electrostatic field. The gas ion reduction of space charge resistance at the cathode surface is further assisted in a gas atmosphere by the positive grid in proportion to the applied positive potential of the grid and the resultant effect on the speed of the electrons in collisions with the gas molecules to displace more electrons from the gaseous molecules and thus create more ion charges and current flow to the anode. It must, however, be emphasized that the total power output available must be supplied by thermionic emission from the cathode in any vacuum or gas-filled atmosphere of the present invention as well as the small amount of power required by the control grid.

It is well known that to obtain the lowest internal tube drop and the highest output voltage efficiency in a conventional rectifier tube the anode must be placed as close to the cathode as is practical. This factor severely limits the diameter of the anode to be only a few thousandths of an inch larger than the diameter of the cathode used. To obtain a large power capacity in the anode circuit by a substantial increase in the size of the anode would require a proportional increase in both the size of the cathode and its heating power requirements in order to maintain efficient, close spacing between the cathode and the anode. This limiting factor in conventional rectifier tubes is virtually eliminated in the present invention inasmuch as it is only necessary to increase the outside diameter of the positive grid to utilize a much larger anode and still maintain an efficient flow of current from the cathode to the anode.

*On the Drawings*

Turning now to the drawings, FIGURES 4 and 5 illustrate a simple and effective method whereby a plurality of coated grids 12 can be placed close to both a cathode 10 and an anode 13. In a preferred exemplary type of construction, the cathode 10 may be of generally tubular or hollow cylindrical form as shown and the anode 13 may also preferably be of cylindrical form mounted concentrically with the cathode 10 in an annular housing 11 which may be of glass, plastic, or any other suitable material. The interior of the cathode 10 is preferably left open at both ends so that a suitable heating medium may be passed therethrough or so that a suitable heating device may be inserted therein as will be described in greater detail below. In this exemplary type of construction, the grids 12 consist of individual annular discs which are also mounted concentrically with the tubular cathode 10 and which are stacked one above the other in planes extending transversely to the common axis of the cylindrical cathode and anode. The grids 12 are connected electrically together and are mechanically supported in spaced relationship to one another by metal support rods 17 and 18 which may conveniently be brought out at the bottom of the tube to grid terminals 17a and 18a. All of the grid discs 12 and the support rods have a high resistance coating applied to their surfaces. When thermal energy is supplied to the cathode 10 and a sufficiently high positive voltage is applied to grids 12, the electrons emitted from the cathode are effectively removed from it and are progressively accelerated between the stacked discs until the electrons reach sufficient terminal velocity and kinetic energy to be forced over to the plate or anode in large quantity when they leave the outer vicinity of coated grid 12 and thus reach anode 13. More particularly, a ground terminal 27 of a battery or other source of voltage 15 may be connected to a switch arm 28 connected to a ground terminal which is in turn connected to the output terminal 14 of anode 13. Positive terminal 25$b$ from battery 15 may be connected through switch arm 26 which in turn is electrically connected to the resistive coated grid discs 12 through terminals 17a and 18a connected to the metal support rods 17 and 18.

When cathode 10, which is coated with the usual emissive material such as barium or strontium oxides, is heated to a predetermined point, electrons will be thermionically emitted from the cathode and will be pulled from the vicinity of the cathode and accelerated between and coated disc grids to attain sufficient velocity to reach anode 13. Current will then flow from anode 13 to terminal 14, through a mutual ground point, and thence to the terminal connected to switch arm 20. Current may then be drawn between terminal 20 and terminal 19 which is connected to the cathode 10 by connecting any suitable load schematically indicated by the resistor 29 between the terminals 19 and 20. The amount of current drawn from the heated cathode 10 to the anode 13 will be in proportion to the positive voltage applied to the coated disc assemby 12 and in proportion to the amount of resistance 29 in the return circuit through terminals 19 and 20. If a steady positive voltage is applied to the accelerator grid 12, the power output between terminals 19 and 20 will also be pure direct current. If the positive voltage applied to the grid 12 is cycled from zero to positive and then back to zero again by connecting terminal switch 26 to terminal 25a of any suitable alternating current source and by connecting terminal switch 28 to terminal 27a of the alternating current source 16, the current obtainable from the terminals 19 and 20 will also be cyclic in proportion to the instantaneous magnitude of the grid voltage. Hence, pulsating direct current may be obtained between cathode terminal 19 and anode terminal 20 when an alternating or cyclic voltage is applied between anode terminal 14 and grid terminal 26. The pulsating direct current available between terminal switches 19 and 20 may conveniently be applied to the primary winding of an output transformer T1. When terminals 19 and 20 are connected to the terminals 22 and 22a of the primary winding so as to complete the anode to cathode circuit through this winding, the output from terminals 23 and 24 of the secondary winding of transformer T1 will be alternating current due to the pulsating direct current field in the windings of the transformer.

Of course, it will be understood that the electrode in this type of device should be hermetically sealed between cathode 10 and anode 13. However, the central or interior portion of the tubular cathode 10 is preferably left open to the atmosphere in order that it may be efficiently heated from any suitable source such as a heated gas, oil, etc., passed through the tubular cathode. In practice, it is preferred to pass such a heating medium through an external heat exchanger of any conventional type (not shown) so that the incoming heating medium is placed in heat exchange relationship with the medium leaving the tube in order to increase the heating efficiency. Also, it will of course be understood that any conventional electrical heating element may be used if convenient or desirable to heat the cathode 10 either by solely electrical means or by a heat exchange medium supplemented by electrical means.

In practice, it has been found that the operating temperature of the cathode is preferably from about 900° F. to 1100° F. The actual temperature required is of course dependent on the type of emissive coating used on the cathode wall inside the hermetically sealed structure. Emissive cathodes may be constructed without any type of emissive coating applied to them, but in general this type of cathode requires much higher temperatures and gives less efficiency than the more conventional coated type. However, any type of cathode arrangement and structure may be used which is an efficient producer of electron emission from a heated cathode surface.

Attention is now directed to some of the novel electrical and mechanical features of the construction of a coated grid assembly as illustrated in FIGURES 4, 4a and 5. The complete grid assembly as shown in FIGURES 4 and 5 may consist of thin metal discs electrically and mechanically connected together by means of support rods 17 and 18 to form a vertical stack of annular metal discs as shown. One suitable type of individual disc grid is shown in FIGURE 4a and is seen to comprise a metal annular disc 12a coated with a resistance material 12b and provided with apertures or holes 12c which receive the metal support rods 17 and 18 and make electrical contact therewith. It will be noted that the inner and preferably the outer edges of the coated grid disc assembly are somewhat tapered and rounded so as to avoid blunt surfaces or sharp edges. The metal chosen for the circular discs should be a type that will permit an adherent bond of the resistance material chosen. The combination of metal and resistance material selected can be any compatible combination of numerous types well known to the ceramic and metal working industries. The ceramic or resistive material can be sprayed, dipped or press-molded or otherwise attached to the metal discs. The resistive material can be then fixed, centered or bonded by any suitable method to the discs and to the support rods. The support rods should be coated also over any portion of their surface which can attract electrons flowing between the cathode and the anode in order to prevent excess current flow.

By way of example only, the resistance coating materials may be those disclosed in my prior Patent No. 2,677,070 issued on April 27, 1954. As noted therein, the nature of the coating composition will of course depend on the resistance value desired. For fairly high temperatures, a vitreous type enamel may be used on the grid. This type of enamel is commonly used for protecting corrodible materials and normally consists of vitrefied calcium silicates. A large variety of materials may be used in the preparation of such vitreous enamels and their preparation is well known in the art. Normally, the vitreous enamel compositions are prepared by fusing together feldspar, borax, quartz, soda ash, fluorides, and a suitable opacifier. The resulting molten glass is then poured into a stream of water to form a frit which is ball-milled either wet or dry and then applied to the metal surface by dipping, spraying or dusting. Furthermore, as also disclosed in my above-noted prior patent, other materials such as the spinels including the ferrites may also be used as a coating material for applications in which their characteristics are desirable.

Also, instead of metal disc grids, other grid constructional methods and materials may be used such as ceramic molded discs or plates which contain metallic oxides as resistive materials or semi-conductor materials. Alternatively, the discs may be made solely of semi-conductor materials, sintered metallic oxides, or the like. As shown in FIGURE 4b a ceramic molded disc grid, semi-conductor discs or sintered metallic oxides discs 12d may have generally the same annular disc shape as the grid shown in FIGURE 4a. In the construction of FIGURE 4b, however, since the central metallic plate 12a is not used, it is necessary to apply a metallic or electrically conductive connection 12e preferably to the outer periphery of the grid structure. The conductive strip 12e may be applied to extend around the outer edge of the initial grid structure by means such as a metal vapor coating in a vacuum, metal paste applications that are furnace fired, or the like. The metal strips 12e which are applied to or which may be integrally molded into the outside diameter of the discs are electrically and mechanically connected to the support posts 17 and 18 by extending the conductor 12e through a conductive portion 12f to a metallic lined interior of the support post aperture 12c. The metal strip or conductor 12e is in turn coated with a resistance layer 12g to protect the grid from absorbing excess electrons at the outside diameter of the discs.

There are obviously many other practical methods of making grid structures, certain others of which will be described in detail below. It should be pointed out here, however, that the grid structure need not necessarily be in disc form but could be in rectangular or other plate form to accommodate a cubically shaped tube. Furthermore, in an annular tube the plurality of stacked discs could readily be replaced by a flat ribbon spiral grid extending substantially from the top to the bottom of the tube and having inner and outer diameters substantially equal to those of the disc type of grids shown in FIGURES 4a and 4b. In certain types of tubes, the flat ribbon spiral type of grid affords a simpler type of construction and serves the same purpose of utilizing a wide, flat plate like grid structure to eliminate multiple small grids. In either the disc or spiral form, it will of course also be understood that a plurality of concentrically arranged stacks of disc or a plurality of concentrically arranged spiral grids may also be used between the cathode and the plate to establish a continuously varying potential gradient if desired. Whether the grid structure be a single or multiple stack of discs, a flat spiral ribbon, or other configuration, the essential characteristic is that there should be a resistive coated plate-like grid structure positioned in the tube to extend a substantial portion of the distance between the cathode and the anode of the tube so that electrons emitted from the cathode may be accelerated to the anode solely under the influence of a positive voltage applied to the grid without requiring the application of an external voltage to the anode.

Any of the types of grid construction described above can also be designed to permit a substantial voltage gradient from the inside diameter of the discs to the outside diameter or to the metal strips in the type shown in FIGURE 4b. This may be done by using a low enough resistance material to permit sufficient current load from the inside to the outside diameter of the grid to provide the desired voltage gradient. This is a simple means which provides not only efficient electron acceleration but also permits the use of positive grid voltages of very high acceleration efficiency near the outer diameter of the grid discs without subjecting the cathode surface to excessively high electrostatic forces.

The resistivity measurements through the coating are understood to be from any portion of the resistive surface to the metal discs underneath and to the support rods. In the embodiment utilizing metallic strips applied to the outside diameter of the discs, the measurements, are from the inside diameter of the discs to the metal strips. The resistance of the coating applied for most applications should preferably be in the kilohm or megohm range from the coated surface to any metallic connection in the disc or the support rods. Primarily, the resistance should not be high enough to permit electron charge to accumulate on the resistive surface, or low enough to permit excess current flow through the grid structure. If the resistance is allowed to be so high as to be a good insulator, the coating will accumulate such a high negative charge that the grid structure will become inoperative and the current will cease to flow from cathode to anode. This is true even with a high positive voltage applied to the internal portion of the grid. The outer surface of the grid will then act as a negative grid and prevent current flow from the cathode to the anode.

For design purposes, the inside diameter of the grid discs will obviously depend on the size of the cathode required for a given output of current. Whatever size cathode is required, the inner edge of the grid assembly should be designed to be within a few thousandths of an inch of the cathode. Although the distance between the cathode and the grid can vary considerably according to thermionic converter or tube design requirements, that is to say, according to whether vacum or gas filled, etc., in general, this distance between the cathode and the grid is preferably 0.010 inch to 0.020 inch. Vacuum types of thermionic converters or electronic tubes require closer spacing between the cathode and the grid than is needed for gas filled types.

As noted above in connection with both FIGURES 4a and 4b, the leading edges particularly of the inside diameter of the grids should not be blunt or square-faced. Rather, they should have a smooth, thin and rounded edge. Further, the total thickness of these discs should be as thin as practical, preferably not more than .0010 inch to 0.020 inch, except in large converter assemblies. However, thicker or thinner discs may be used with good results.

The spacial relation between the outside diameter of the grid assembly and the anode is subject to more design variations than is required for the cathode to grid spacing. The most variable factor is how litle or how much retarding effect is desired on the electrons before they strike the plates. The size of the cathode and anode, whether the tube or thermionic converter is vacuum or gas filled, the grid voltage desired to be used, output power desired, etc., must all be considered in determining the grid to anode spacing. A wide range of thermionic converters, for example, may use spacing as low as 0.005 inch to 0.250 inch. However, some design requirements may be lower than these figures or may exceed them.

In addition, the space provided between the coated discs or between the turns of a coated spiral grid can vary over wide limits in respect to the over-all structural design requirements. In general, this spacing may range from 0.010 inch to 0.100 inch. Smaller or larger spacing than this may be required for various sizes of thermionic converters since the converters may range from very small to very large types depending upon the intended application and output.

The width of the discs will depend on the size of the cathode required for the amount of current to be provided by the cathode or the type of heating means used. The anode area and diameter will then depend on the amount of total power the anode must handle efficiently. The width of the discs must then be sufficient to have the inside diameter close to the cathode and have a large enough outside diameter to be close to the anode as outlined in detail above.

As noted above in connection with FIGURE 4, any suitable heating or heat exchange medium or fluid may be passed through the interior of the tubular cathode 10 to provide the necessary heating thereof. Although the standard electrical heating element could of course be inserted in the cathode if desired, it is primarily intended that hot gases, liquids, molten metal or powdered metal may be used which are capable of being heated and forced through the center of the cathode structure. After being used to heat the cathode, they may then be returned, preferably through a heat exchange arrangement placing them in heat exchange with the incoming medium, to the preheater system. The preheater may be of such a nature as an atomic reactor or other sources of heat which might be preferred to be remote from the cathode.

Another important aspect of the heating system possible with the tubular cathode is that the cathode can be heated by super-heated steam, with or without application of the steam to a steam generator system for producing electricity or for other motive purposes. If the thermionic converter is used in conjunction with a steam generator, the supper-heated steam can be forced through the hollow cathode construction 10 of one or more thermionic converters in series or parallel arrangement. In this manner, the hot steam can be utilized to heat the cathodes of a number of thermionic converters before being used in the steam type of electrical generator. The over-all efficiency of the system is thereby obviously increased since the efficiency of the thermionic converter would be combined with the normal steam generator output which has only a slight loss in steam heat.

Figure 6A:
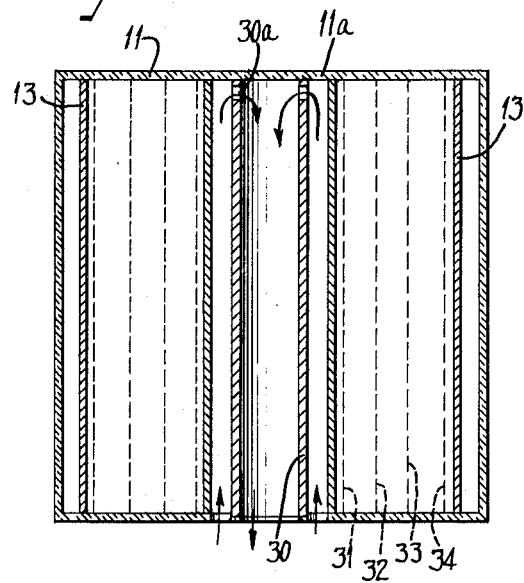
FIGURE 6a is a central vertical cross-sectional view of the device shown in FIGURE 6.

In FIGURES 6 and 6a there is shown a cylindrical thermionic converter wherein a plurality of grids 31, 32, 33 and 34 are positioned between a hollow tubular cathode 10 and concentrically positioned cylindrical anode 13 with increasing positive voltages applied to the separate grids to progressively accelerate the electrons from cathode 10 to anode 13 as they pass through progressively higher potential fields in the control grids and until they pass through the last grid next to anode 13. For example, the grids 31, 32, 33 and 34 could have progressively higher voltages from 100 to 400 volts positive applied to them respectively. The individual grid structures 31, 32, 33 and 34 may each be of either of the types shown in FIGURES 4a and 4b but each also having a progressively larger inner diameter so that they may be spaced progressively and concentrically from the cathode to the anode. In the drawings, the grids are shown only schematically by dotted lines. It should be understood that this dotted line showing is intended to indicate that the plurality of individual grids may each comprise either a resistive coated wire mesh grid similar to the type shown in my prior patent or may comprise disc, spiral, or in general plate-like grids of the type disclosed herein. Although the plate-like grid is preferred and has been found to be more efficient, it will be understood that a plurality of wire mesh grids can also be used.

Also, in the type of construction shown in FIGURES 6 and 6a, it will be noted that a hollow (or solid if desired) metal insert 30 is provided and is concentrically positioned inside the tubular cathode 10. As indicated by the arrows in FIGURE 6a, a heating medium can thus flow upwardly from the bottom of the tube between the exterior of insert member 30 and the interior of the cathode 10 and may then enter through apertures 30a in the top of insert member 30 and return down through the center of the hollow member. This type of construction concentrates most of the heat energy directly at the cathode 10 where the applied heat is most effective for thermionic conversion purposes. Although this type of insert 30 is not required, it does increase the heating efficiency of the cathode 10 as follows. First, it channels the heating medium up in a column close to the cathode 10 with a minimum of medium being required. Secondly, the insert 30 reflects heat back to the cathode 10 from any radiation emitted from the heating medium and thus prevents it from having as much heat loss as would normally occur. Of course, the top of the cylindrical cathode member 10 in this type of construction is closed by a plate member 11a. If a solid insert member 30 is used, the plate member 11a may be omitted and the heating medium permitted to flow out through the top of the tube.

Figure 7:
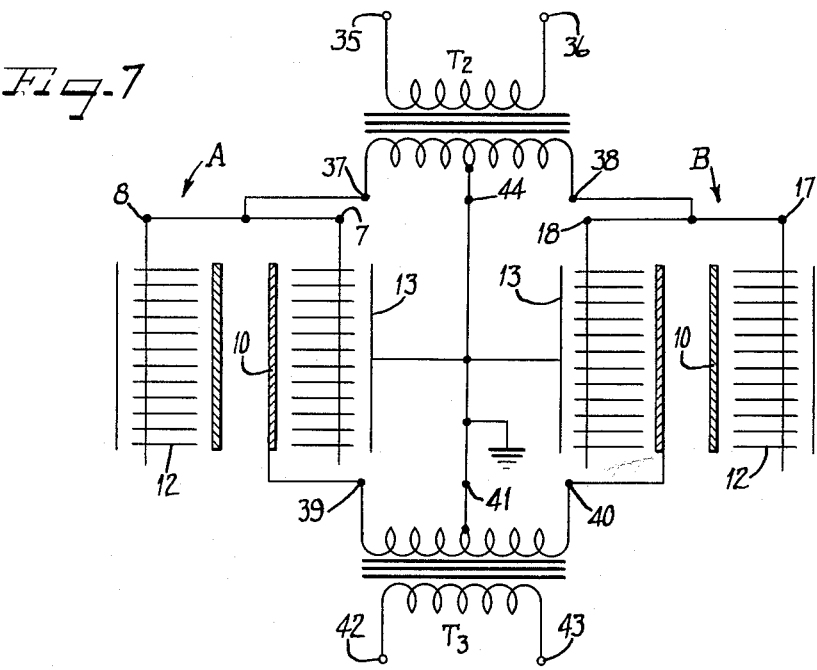
FIGURE 7 is a vertical cross-sectional view, partially schematic, of two thermionic converters connected in such a manner as to have alternating current grid drive and an alternating current output.

In FIGURE 7, there is illustrated the use of two thermionic converters A and B respectively, connected in a push-pull arrangement wherein the push-pull transformer T2 is connected to the control grids 12 in both tubes A and B. These converters would be alternately positive and negative in their voltage output to the grids 12 through terminals 37 and 38 when an alternating voltage is applied to transformer T2 at terminals 35 and 36. Such an applied voltage forces one thermionic converter to be conductive while the other is prevented from being conductive. When, as shown, the cathodes 10 of tubes A and B are connected at terminals 39 and 40 of transformer T3, with the center tap terminal 41 connected to ground, then alternating current can be obtained between terminals 42 and 43 of the secondary winding of output transformer T3. It will also be noted that the anodes 13 of the thermionic converters in the circuit arrangement are also connected to ground, as shown, as well as the center connection of the grid input transformer T2 at terminal 44. This type of circuit forms a very efficient alternating current generator. It will, of course, be understood that although the tubes are shown as being of the type illustrated in FIGURE 4, any of the types of thermionic converters illustrated herein including that shown in FIGURE 6 may also be used in a similar circuit.

It will also be understood that three tubes could be set up in a delta or Y input circuit for the grids and an output delta or Y circuit for the cathodes to obtain three phase current on the output winding. In addition, two-phase or polyphase circuits also can be utilized to obtain two-phase or polyphase output voltages.

Figure 8:
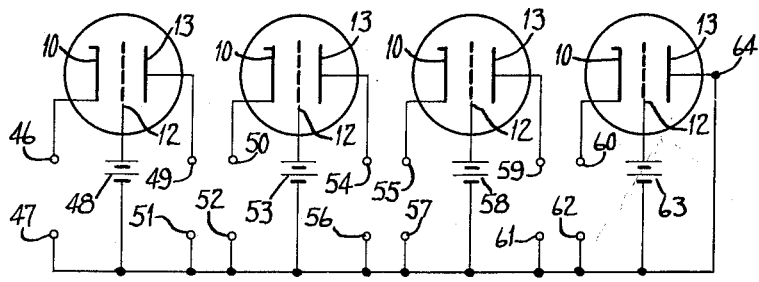
FIGURE 8 is a schematic diagram illustrating a method of using the thermionic converters in series or parallel connection.

In FIGURE 8 there is shown a schematic diagram of four thermionic converters, C, D, E and F which, by making appropriate connections between the terminals shown on the drawings, may be connected either in cascade or in parallel in order to derive output power from the circuit. In order to complete a series or cascade connection of the converters shown, the cathodes 10 and anodes 13 are connected at terminals 49 and 50 of thermionic converters C and D, at terminals 54 and 55 of converters D and E, and at terminals 59 and 60 of converters E and F. Output power is then obtainable at terminals 46 and 47 or at terminals 60 and 62 if terminals 46 and 47 are connected together. In order to obtain a parallel connection, power output can be taken at terminals 46 and 47 of converter C with terminals 49 and 51 connected; power can be obtained at terminals 50 and 52 of converter D with terminals 54 and 56 connected; power can be obtained at terminals 55 and 57 with terminals 61 and 59 connected together as grounds; and finally, power can be obtained from terminals 60 and 62 when anode 13 of thermionic converter F is grounded at terminal 64, as shown. Of course, it will be understood that all of the above-enumerated output terminals from which power may be derived may be connected together in a single output circuit. This arrangement then permits four parallel power output connections with the result that the total power output is quadrupled in parallel at the same voltage. When used in parallel arrangements, the positive grids should all have the same positive voltage. However, if the thermionic converters are connected in cascade as first above described, then the positive voltages applied to the grids 12 should preferably increase. That is to say, battery 53 preferably has a higher output voltage than the positive voltage from battery 48, the positive voltage at battery 58 being higher than at 53, and the positive voltage at battery 63 being higher than at 58 in order to obtain progressively higher voltage throughout the series circuit. The highest output power then would be available at terminals 60 and 62 providing terminals 46 and 47 are connected together.

In FIGURE 9 there is shown a particularly preferred cathode heating system of very high efficiency which is applicable for use in heating the cathodes of any of the thermionic converters of the present invention. As shown in FIGURE 9, the tubular cathode 10 has a coating 71 on the inner surface thereof along that portion of the cathode which is to be heated. The coating 71 is a composition containing a suitable type of catalytic material such as the oxides of chromium, iron, ruthenium, rhodium, platinum, etc., on suitable promoter bases such as alumina and which is highly exothermic to any suitable reactive fluids introduced at the bottom of the tubular cathode and allowed to flow through to the top. When the above particularized exemplary catalytic materials are used, a suitable reactive fluid may consist of gases such as isobutane, n-butane, propane, methane or more generally, any of the hydrocarbon gases or other similar gases which react exothermically with the coating material.

A solid tubular heat reflecting and flow directing member 70 may be positioned concentrically inside the tubular cathode in a manner similar to that in which the hollow heat reflecting member is positioned in the device shown in FIGURE 6. Alternatively, the internal reflecting and flow directing member could be the same as that shown in FIGURE 6 so that the gases leaving the cathode are in heat exchange with the gases entering to more fully utilize the heat generated from the reaction. In the solid tube arrangement shown in FIGURE 10, this same result may be achieved by the use of an external heat exchanger of any conventional type. The flow director and heat reflector 70 forces the incoming gases to all the effectively reacted to by the catalytic coating before emerging at the top or returning through the center. With this type of construction, as low as 1% of reactive gas in an air stream passed through the cathode can react with the catalytic coating to provide sufficient exothermic heats of reaction to heat many types of cathodes very efficiently. Without the benefit of the catalytic coating, a much higher percentage of reactive or combustible gases would be required to be burned to create an equivalent amount of heat. Furthermore, with the catalytic coating applied to the cathode wall, the heat generation is at the surface of and throughout the catalytic material, thus providing a very efficient heat generation and transfer means which is in intimate contact with and is a part of the cathode surface.

FIGURE 10 is a transverse cross-sectional view of the cathode assembly shown in FIGURE 9 and is taken on the line X—X of FIGURE 9 showing the cathode 10 provided with the catalytic coating 71 and heat reflecting member 70.

In FIGURE 11, there is illustrated a means of utilizing solar heat energy or rays of sunlight to provide the heat required for an efficient thermionic converter. In this type of construction, the thermionic converter may be of any of the types described above and is preferably made to have a cathode 10 which is an arc of a circle by utilizing only one segment of the above-described converters. The arcuate converter may utilize a concave mirror or a reflector 72 and is positioned in a predetermined relationship to reflector 72 either by independent mounting means or by the rods 73 and 74 which serve not only as legs to support the concave mirror in a predetermined position, but are also continued to support the converter in an adjustably predetermined position with respect to the mirror. Legs 73 and 74 may, for example, comprise adjustably telescoped tubes so as to vary the position of the converter at will. The legs 73 and 74 could, if desired, be replaced by a glass or other transparent casing and support member which is generally of concave annular configuration and which extends from the edges of the mirror 72 to the housing 11 of the converter to support the converter in fixed position. Such an arrangement has the advantage of preventing the mirror surface from tarnishing but may be impractical in very large installations. It will, of course, be understood that the physical details and design considerations are determined by the type of application for which the converter is intended and by the power output desired.

In any type of construction, the sun's rays, represented in FIGURE 11 by the lines 75, 76, and 77, strike the reflecting mirror 72 and in turn are directed by the mirror onto the cathode surface 10 as shown by the arrows. The heated cathode 10 will provide electron emission for positive grid 12 to accelerate the electrons over to anode 13. The converter (or if desired a plurality of converters) may then be connected in any of the circuits above described to provide useful power output. It is not necessary that there be a focal point such as is shown at point 78, but rather the infra-red rays from the sun could simply be directed onto the cathode 10 to heat its surface.

It will, of course, be understood that the concave mirror is shown by way of example only and that any suitable optical system such as a collecting lens could also be used to direct the sun's energy onto a cathode to be heated. The size of the cathode will obviously determine the most suitable type of optical system. In a converter having a cathode of small diameter, for example, it may well be desirable to place the cathode at a focal point to concentrate the sun's rays to achieve higher temperatures.

It will of course be understood that a separate power supply such as a wet or dry cell battery to provide a positive voltage to the coated grid would be required to initiate conduction through the converter shown in FIGURE 11 or in any of the other types of tubes or thermionic converters of the present invention. However, after the tube or converter has attained full power output, part of the power output may be used to provide the coated grid potential since it would consume only a small part of the total power available. This may be achieved either by manually or automatically switching the starting battery out of circuit and utilizing power from the output directly, or it may be achieved if a wet cell or storage battery is used by utilizing the output power from the tube to recharge this storage battery. The grid voltage requirements are in excess of the magnitude of the positive voltage available directly at the cathode, but any conventional voltage step-up means well-known in the art may be used and may be actuated from the output power. Such step-up means may, for example, comprise the usual type of vibrator circuit found commonly in the electrical systems of present day automobile radios.

In remote locations such as farm areas and particularly in southern or tropical areas, the solar heated arrangement shown in FIGURE 11 in conjunction with a rechargeable starting storage battery affords a convenient, compact and economical means of generating electrical power. It will, of course, be understood that auxiliary or supplementary heating means may be provided for the cathode of the device shown in FIGURE 11 so that its operation is not restricted to those intervals of time in which sunlight is available. For example, any of the previously described heating methods could be used in combination with the solar heating arrangement shown in FIGURE 11 so that the converter could be rendered operative during dark intervals. Furthermore, if a sufficiently adequate storage battery arrangement is provided, the converter shown in FIGURE 11 may be operated during intervals of available sunlight to continuously charge the storage battery. Alternatively, or additionally, the system of storage batteries may be used to supplement the heating of the cathode during intervals in which some sunlight is available as well as to provide the necessary grid potential. It will, of course, be understood that the details of the particular system which is most desirable will depend upon the specific application intended for the system. Thus, in fixed locations where a supply of hydrocarbon gas in various forms is easily maintained, it would normally be preferable for power generation purposes to supplement the solar heating system by a catalytic-reactive heated cathode system and to use an auxiliary battery only for starting the system by applying the necessary grid potential. In relatively low power applications where it is desired that the system be portable, on the other hand, and particularly where virtually continuous sunlight may be assured as in missile or other airborne applications, it will usually be preferable to use a purely solar heated cathode and to rely on a small auxiliary storage or other battery source for starting the operation of the device.

As noted above, the converter shown in the system of FIGURE 11 may be in its detailed construction any of the types of converters shown in the earlier figures of the drawing. That is to say, it may utilize either disc, spiral, or multiple grid arrangement. It will be obvious that other equivalent grid arrangements are also possible in the solar heated, the catalytic reaction, or in any of the other types of converters shown herein.

Figure 12:
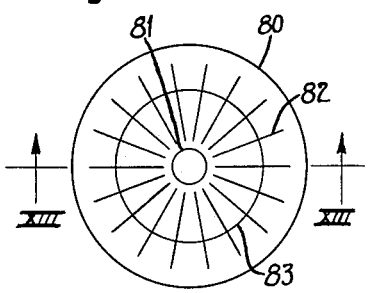
Figure 13:
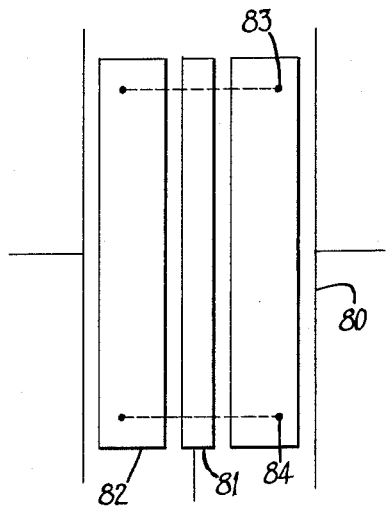

On such possible alternative grid structure is shown schematically in FIGURES 12 and 13 and a modification thereof is shown in FIGURE 14. In these embodiments the coated grids take the form of thin vertical strips rather than discs or spirals. In FIGURE 12, there is schematically shown a transverse cross-sectional view of a thermionic converter arrangement which is also shown in a schematic central vertical sectional view in FIGURE 13. In this embodiment, a cylindrical plate or anode 80 is mounted concentrically around a tubular cathode 81 which may be heated in any of the ways described above. A plurality of vertically positioned grids comprising coated plate members 82 are positioned between the cathode 81 and the anode 80. The vertical grid strips 82 may be mounted on supporting ring members 83 and 84 which may in turn be supported from the tube housing in any convenient manner. It will be noted that the thin coated grid strips are positioned in radial planes passing through the vertical central axis of the tubular cathode. That is to say, the central axis of the cathode lies in the plane of the radially extending vertical grid strips 82. In FIGURE 14, which is a top plan view of a modification of the device shown in FIGURES 12 and 13, the anode 80 is also concentrically positioned around tubular cathode 81. A first group of radially extending vertical coated grid strips 82 is mounted on a ring 83 in the manner discussed above, but extends only a small fraction of the distance from the cathode to the anode. A second pair of ring structures as shown at 87 of larger diameter than the ring 83 supports a second row of vertical grid strips 85 and 86. The vertical grids 86 may be radially aligned with the grids 82 whereas the grids 85 are positioned between the grids 86 and 82 and extend a greater distance toward the cathode than do the grids 86. There is thus provided both an outer and an inner vertical grid system co-aligned with each other as shown. By this means, a portion of both grid systems would be in direct alignment and a portion would be in between parts of the inner grid system. This dual grid system can be used as a single grid by electrically connecting its two parts together or it can be used as two separate grids having two different positive grid potentials for increased acceleration purposes by applying a higher potential to the outer grid. Conversely, the outer grid also may be used for deceleration purposes. The ring mounting means are used for alignment and for electrical connection to each grid in the manner discused above in connection with the metallic supporting rods 17 and 18.

While a central tubular cathode 81 has been shown in both FIGURES 13 and 14, it will also be obvious that the vertical plate coated grid structures shown in either of these embodiments may readily find application in a device in which the central tubular member 81 is either omitted or is used simply as an insulating support member with a flat circular cathode placed at the bottom of the tube structure and a flat circular anode placed at the top of the tube structure. Such a construction can, for example, advantageously be used in the solar heated cathode arrangement shown in FIGURE 11. It will be course be understood that the grid members 82, 85 and 86 would be of a material and type of construction similar to that shown for the disc grid members in FIGURES 4a and/or 4b. The variation shown in FIGURES 12, 13 and 14 is directed solely to possible alternative shapes and positions for the grid structures.

In any of the embodiments of grid construction described above, it will be noted that the essential feature is that a grid system, preferably of disc, spiral, or plate-like construction, be positioned so that it extends a major portion of the distance between a cathode and anode in order that an electric potential field may be established by application of a positive voltage to such a coated grid structure which field is alone sufficient to accelerate electrons emitted from a heated thermionic cathode to the anode without the application of an external voltage to the anode. Various possible grid configurations have been shown which are capable of achieving this purpose. Insofar as dimensional ranges or limits in fact exist, these limits have also been set forth numerically above. It should, however, be noted that as pointed out in connection with FIGURE 6. the grid structure need not be a single unitary grid but may, for example, be a plurality of progressively spaced coated grids. However, whether a plurality of wire or disc grid structures or a single or unitary grid stucture be utilized, the coated grid assembly as a whole must begin relatively close to the cathode and terminate relatively close to the anode so that grid structure either separate or integral exists over a major portion of the distance between the cathode and the anode in order to establish the accelerating electric potential field necessary to draw electrons from the cathode to the anode without application of an external voltage to the anode. It will be apparent from the foregoing that this purpose and method of converting heat to electrical energy may be carried out by many different structures. In the exemplary detailed embodiment of the structures shown herein, it should be understood that each of them are hermetically sealed units. Furthermore, within these hermetically sealed units the anode is insulated from the cathode and grid elements in order to prevent electrical shorting between the electrodes. The sealing and insulating means may be of numerous types well-known in the art.

It has been pointed out previously that in the use of thermionic converters or electronic tubes the principles outlined in the present invention can be applied in both vacuum and gas-filled atmospheres. The highest power output and greatest efficiency are obtainable in a gas-filled atmosphere. Almost any type of gas filling may be used which would be compatible with the electrode elements and which would provide a desirable amount of efficiency. Further, a very wide range of gas pressures may be used. In general the most preferred gas pressure ranges from 1 to 25 microns. When filled with an efficient type of gas, such as xenon, argon, mercury, etc., the thermionic converters or electronic tubes utilizing the invention herein disclosed possess very unique properties.

In a gas-filled atmosphere the coated grid will absorb a smaller quantity of electrons for a given flow of current and at a given positive potential than in an evacuated space. One of the reasons for this seems to be that when the electrons reach enough velocity in the positive grid accelerator region to cause the ionization of gas molecules, the strong positive space charge field of the ions then tends to divert a substantial quantity of the electrons from striking the grid. Another factor affecting the grid current seems to be due to the apparent ability ions possess to remove electrons from the surface of materials they contact or to which they come very close. Hence, it is believed that the ionized gas particles reaching grid surfaces at the same instant that electrons strike the grid surfaces can remove some of the electrons before they have time to penetrate the resistive coating. Also some of the electrons that have penetrated the surface will undoubtedly be pulled back out of the resistive material and be absorbed by the gas atoms. All of these electron absorption reactions by gaseous ions result in less current flow to the positive grid circuit. The strong positive space charge of both the gas ions and the coated grid supplement each other to provide much better and more efficient power output than is obtainable in a high vacuum atmosphere.

Another unusual and valuable feature of the accelerator grid in a gaseous atmosphere resides in the fact that higher positive voltages can be applied to the coated grid for efficient electron acceleration than could be tolerated at the anode. In other words, in a conventional gas tube the anode voltage is limited to the internal drop of the tube. In a mercury type of tube at 7 to 9 microns pressure the internal tube drop is normally 12 volts. Any attempt to raise the anode voltage above 12 volts would merely provide a better electron sink at the anode to draw greater amounts of current and would not result in raising the anode voltage above the normal tube drop. This effect would be progressive up to the point of destroying the cathode if carried far enough without, however, actually raising the anode voltage.

The above situation is radically altered in the present invention. In the first place, the positive grid voltage can considerably exceed the normal tube drop in a tube having a given type of gas, at a given pressure, without endangering the cathode due to the extremely low current absorption ability of the resistive coating and regardless of its potential. The anode being at ground or at some negative potential cannot exert an excess current condition on the cathode. By the proper choice of load and impedance in the cathode circuit, the cathode positive potential can be allowed to rise to values much higher than the normal tube drop without any destructive effects on the cathode. Instead, two major benefits will occur. One is that the higher than normal tube drop positive potential of the cathode will permit higher output power to be obtained for a given amount of current flow from the cathode to anode. The other major advantage is that the higher the positive voltage at the cathode, the greater the space charge repulsion will be on any positive ions seeking to bombard the surface to obtain electrons for recombination. At sufficiently high positive voltages the ions will be completely repulsed or slowed down to make their impact energy harmless at the positive potential cathode surface. The main ion bombardment of positive ions in the tube structure will occur primarily at the negative anode surface. This surface can stand far greater ion bombardment than any conventional cathode surface. This movement of ions to the anode surface considerably reduces the retarding effects of the anode ground or negative potential, virtually right up to its surface, due to the high positive space charge of the ions. Furthermore, the positive electrostatic field of the grid being perpendicular to the plane of movement of the ions in their migration to the cathode or anode does not accelerate ion movements as effectively as a positive anode potential. A positive anode would then be in the direct plane of movement of the ions and would force the ions toward the cathode at a velocity proportional to the positive potential of the anode and the mass of the ions, transit distance, etc.

The higher than normal tube drop positive potentials on the grid permit still another important advantage to be gained in respect to increased ionization effects. The greater the electron speed, the larger the number of elastic and non-elastic collisions that will occur between electrons and gas atoms and which result in a greater ion density in the conduction path. Further, the higher than normal tube drop voltage on the grid will cause electron accelerations greater than those limited to the normal tube drop and can result in a substantial increase in the statistical probability of ions losing more than one electron from their orbits, which in turn would proportionally increase the space charge efficiency of the ions by increasing electron conduction.

In contrast to normal cathode to anode tube drop in conventional gas-filled tubes, electronic devices of the present invention can be operated at full efficiency and high amperage output at a small fraction of a volt differential between the cathode and the anode. This is due to the almost total absence of space charge resistance in the tube when properly designed and used. This high mutual conductance is true of the vacuum type tubes as well as the gas-filled types. Both vacuum and gas-filled tubes can be operated with maximum current flow and still have less than .1 volt differential between the anode and cathode. In fact, a large diameter copper conductor can be connected between the cathode and anode. The full current output of the device can be obtained then at only a few millivolts potential difference between cathode and anode.

Since the positive grid is not connected to the output power circuit except through the positive supply means to ground, its potential affects only two things; namely, the total output current, and the potential difference between cathode and anode. The lower the resistance or impedance between the cathode and anode in the external circuit connections, the lower the internal tube drop between cathode and anode. This abnormally low tube drop or abnormally high tube drop offers very substantial design advantages to match a very wide range of output power into an equally wide range of circuit impedances; whereas, in normal electron tube or generator service the external power load circuits must be matched to the internal resistance of the electron tube or generator and often reduces the efficiency and results in other disadvantages.

Although the diagrams in the drawings show the circuits to have a grounded anode, the thermionic converters and tubes can be efficiently operated with the cathode grounded and the anode at a negative potential. If the power load impedance between the cathode and anode terminals is excessive, the negative potential at the anode may also rise to an excessive extent in respect to optimum tube efficiency. Thus, the higher the negative potential at the anode, the greater the electron retarding effect may be on current flow. Moderate negative potentials, however, can be highly beneficial in instances where very high electron velocity is required for efficient operation. Then a resistor to ground will permit the anode potential to rise to the point of retarding electron impact energy just before the electrons strike the anode. By this means heat losses at the anode would be considerably reduced. There are conceivably numerous types of circuit applications which could advantageously use grounded-cathode and negative anode power output.

In addition to their use for the self-generation of power output, these electronic tubes and thermionic converters can be used in conventional equipment in which anode power supplies are available. For example, the coated grid electronic devices can be used to give either substantially increased power output or the original amount of power at considerably reduced load requirements on the power supplies. The anode may be operated at a negative potential with both the anode and the positive end of the power supply grounded.

In types of construction where it is of advantage, a metallic shield grid means may be positioned in front of the inside diameter of each coated grid disc. Then when a small negative potential is supplied to the shield grid, it will deflect electrons away from the leading edges of the coated grid discs and a substantial portion of the inner regions of the discs to reduce the power load in the grid circuit still further. In most instances this technique is not of particular advantage except where a lower than normal resistance in the coating is desired. The grid shield means obviously should be in mechanical alignment with each disc that it shields to prevent interference with the free flow of electrons between the discs. Moderate negative grid voltages on the metallic shield grid would cause minor losses in tube efficiency due to the high overriding efficiency of the positive potential on the coated grid.

From the foregoing it may now be understood that the resistive-coated grid provides an important control grid function for gas-filled tubes and thermionic converters. Obviously, this type of control grid can provide smooth, continuous control over the electron conduction path since the electron flow is dependent on the voltage of the accelerator grid at any instant. Further, the present invention provides this smooth control over direct current or alternating current up into the megacycle range. Since the conduction path can be kept ionized at all times the frequency range is not limited by ionization and deionization time intervals as is the case in presently known gas tubes such as the thyratron.

While a particular exemplary preferred embodiment of the invention has been described in detail above, it will be understood that modifications and variations therein may be effected without departing from the true spirit and scope of the novel concepts of the present invention as defined by the following claims:

I claim as my invention:

1. In an electron discharge device, an electron emitting cathode, an anode, at least one control electrode of electrically conductive material at least partially coated with a coating of resistance material, the resistance of said coating being higher than that of said control electrode but low enough to prevent any appreciable charge accumulation on said control electrode, said control electrode being positioned between said anode and said cathode close enough thereto to accelerate electrons emitted from said cathode to said anode solely under the influence of a positive voltage applied to said control electrode.

2. In an electron discharge device, an electron emitting cathode, an anode, a plurality of control electrodes of electrically conductive material interposed between said cathode and said anode, each of said control electrodes being at least partially coated with a coating of resistance material, the resistance of said coating being higher than that of said control electrode but low enough to prevent any appreciable charge accumulation on said control electrodes, said control electrodes being so positioned with respect to said cathode and said anode that electrons emitted from said cathode can be accelerated to said anode solely under the influence of positive voltages applied to said control electrodes without the application of an external voltage to said anode.

3. Apparatus for the direct conversion of thermal energy to electrical energy comprising, an electron emitting thermionic cathode, an anode, a control electrode of electrically conductive material interposed between said cathode and said anode and at least partially coated with a coating of resistance material, the resistance of said coating being higher than that of said control electrode but low enough to prevent any appreciable charge accumulation on said control electrodes, said control electrode being so positioned with respect to said cathode and said anode that electrons emitted from said cathode can be accelerated to said anode solely under the influence of a positive voltage applied to said control electrode without the application of an external voltage to said anode, means to apply thermal energy to said cathode, means to apply a positive voltage to said control electrode, and means to connect an electrical output work circuit between said anode and said cathode.

4. In an electron discharge device, an electron emitting cathode, an anode, a plurality of control electrodes of electrically conductive material interposed between said cathode and said anode, each of said control electrodes being at least partially coated with a coating of resistance material, the resistance of said coating being higher than that of said control electrode but low enough to prevent any appreciable charge accumulation on said control electrode, the distance between said cathode and at least one of said control electrodes being not more than 0.035 inch, said plurality of control electrodes being so positioned with respect to said cathode and said anode that electrons emitted from said cathode can be accelerated to said anode solely under the influence of positive voltages applied to said control electrodes without applying an external voltage to said anode.

5. In an electron discharge device, an electron emitting thermionic cathode, an anode, a control electrode of electrically conductive material interposed between said cathode and said anode, said control electrode being embedded in a resistance material having a resistance higher than that of said control electrode but low enough to prevent any appreciable charge accumulation on said control electrode, the smallest distance between any of said resistance material and any point on said cathode being not more than 0.035 inch, said anode and said cathode being so positioned with respect to said control electrode that electrons emitted from said cathode can be accelerated to said anode solely under the influence of a positive voltage applied to said control electrode without applying an external voltage to said anode.

6. Apparatus for the direct conversion of thermal energy to electrical energy comprising, an electron emitting thermionic cathode, an anode, a plurality of control electrodes of electrically conductive material interposed between said cathode and said anode, each of said control electrodes being embedded in a resistance material having a resistance higher than that of said control electrode but low enough to prevent any appreciable charge accumulation on said control electrode, at least one of said control electrodes being positioned so that the smallest distance between any point on said cathode and any point on the resistance material in which said electrode is embedded is less than 0.035 inch, said plurality of control electrodes being so positioned with respect to each other and with respect to said cathode and said anode that electrons emitted from said cathode can be accelerated to said anode solely under the influence of positive voltages applied to said control electrodes respectively without applying an external voltage to said anode, means to apply thermal energy to said cathode, means to apply positive voltages to said control electrodes, and means to derive electrical power output between said anode and said cathode.

7. In an electron discharge device, an electron emitting cathode of generally tubular shape, a generally cylindrical anode, a control electrode assembly of generally annular disc shape mounted concentrically with said tubular cathode and extending a major portion of the distance between said anode and said cathode, said control electrode assembly comprising at least one electrode of electrically conductive material embedded in a resistance material having a resistance higher than that of said electrode but low enough to prevent any appreciable charge accumulation on said control electrode assembly, the difference between the inner diameter of said annular disc assembly and the outer diameter of said tubular cathode being small by comparison with the difference between the inner diameter of said cylindrical anode and the outer diameter of said tubular cathode.

8. In an electron discharge device, an electron emitting cathode of generally tubular shape, a generally cylindrical anode positioned concentrically with said cathode, a plurality of control electrode assemblies interposed and hermetically sealed between said anode and said cathode, each of said control electrode assemblies having a generally annular disc shape and being mounted in stacked relationship one above another each concentric with said tubular cathode, each of said control electrode assemblies comprising a control electrode of electrically conductive material embedded in a resistance material having a resistance higher than that of said control electrode but low enough to prevent any appreciable charge accumulation on said control electrode assembly.

9. In an electron discharge device having a plurality of electrodes including a thermionic cathode adapted to emit electrons from one surface thereof, the improvement comprising, a coating of catalytic material on another surface of said cathode, and means to flow an exothermically reactive fluid in intimate contact with said coated surface to heat said cathode.

10. In an electron discharge device having a plurality of electrodes including a thermionic cathode adapted to emit electrons from one surface thereof, the improvement comprising, a coating of catalytic material on another surface of said cathode, means to flow an exothermically reactive fluid in intimate contacts with said coated surface to heat said cathode, and heat reflector means positioned closely adjacent to said coated cathode surface to confine said fluid to flow close to said surfaces and to reflect heat to said cathode.

11. In an electron discharge device, a plurality of electrodes including a thermionic cathode adapted to emit electrons from one surface thereof at elevated temperatures, said cathode being of generally cylindrical tubular shape, a coating of catalytic material on the inner surface of said tubular cathode, and means to flow an exothermically reactive fluid through said tubular cathode in intimate contact with said coated surface to heat said cathode.

12. In an electron discharge device, a plurality of electrodes including a thermionic cathode adapted to emit electrons from one surface thereof at elevated temperatures, said cathode being of generally cylindrical tubular shape, the inner surface of said tubular cathode being coated with a catalytic material, a cylindrical heat reflecting member mounted inside said tubular cathode coaxially therewith and spaced therefrom, and means to flow an exothermically reactive fluid between said inner surface of said cathode and said heat reflecting member to heat said cathode.

13. Apparatus as in claim 12 wherein said catalytically active materials are combined on a promotor base and wherein said fluid is a hydrocarbon gas.

14. Apparatus for directly converting thermal energy to electrical energy with an efficiency greater than 50% comprising, a cathode adapted to emit electrons from one surface thereof at elevated temperatures, an anode, a control electrode assembly comprising an electrically conductive electrode at least partially embedded in a resistance material having a resistance higher than that of said control electrode but low enough to prevent any appreciable charge accumulation on said control electrode, said control electrode assembly being so positioned with respect to said cathode and said anode that electrons emitted from said cathode can be accelerated to said anode solely under the influence of a positive voltage applied to said control electrode, the other surface of said cathode having a coating of catalytic material thereon, means to flow an exothermically reactive fluid in intimate contact with said coated surface to heat said cathode, means to apply a positive voltage to said control electrode, and means to derive electrical output energy between said anode and said cathode.

15. In an electron discharge device, an electron emitting thermionic cathode, an anode spaced from said cathode, means to apply thermal energy to said cathode, means independent of said anode to establish an electric potential field between said anode and said cathode to accelerate electrons emitted from said cathode to said anode, and means to connect an electrical energy output circuit between said anode and said cathode.

16. The method of directly converting thermal energy to electrical energy with an efficiency greater than 50% comprising the steps of, applying said thermal energy to an electron emitting cathode, producing intermediate an electron receiving anode and said cathode an electrical potential field gradient which is independent of the potential of said anode, maintaining said field gradient to accelerate a major portion of said emitted electrons to said anode, and deriving electrical output energy between said anode and said cathode without applying an external voltage to said anode.

17. In an electron discharge device of the type having an electron emitting cathode and an anode the improvement comprising, a control electrode of generally plate-like shape extending a major portion of the distance between said cathode and said anode in spaced relationship to said cathode and said anode, said control electrode comprising a member of electrically conductive material at least partially coated with a coating of resistance material, the resistance of said coating being higher than that of said conductive member but low enough to prevent any appreciable charge accumulation on said control electrode.

18. In an electron discharge device of the type having an electron emitting cathode and an anode spaced therefrom, the improvement comprising, a control electrode of generally plate-like configuration positioned in spaced relationship to said anode and said cathode and extending a major portion of the distance therebetween, said control electrode comprising a first plate-like member of electrically conductive material, said conductive member being coated with a coating of resistance material having a resistance higher than that of said conductive member but low enough to prevent any appreciable charge accumulation on said control electrode.

19. In an electron discharge device of the type having an electron emitting cathode and an anode in spaced relationship thereto, the improvement comprising, a control electrode of generally plate-like configuration positioned in spaced relationship to said anode and said cathode and extending a major portion of the distance therebetween, said control electrode comprising a first member of electrically resistive material, a strip of electrically conductive material around the outer peripheral edge of said first member, and a coating of resistive material over said conductive material, the resistance of said resistive material of said first member and said coating being higher than that of said conductive material but low enough to prevent any appreciable charge accumulation on said control electrode.

20. In an electron discharge device, an electron emitting cathode of generally tubular shape, a generally cylindrical anode, a first ring member concentric with said tubular anode, said first ring member supporting a first group of vertically positioned control electrodes of generally plate-like configuration, each of said control electrodes extending the same distance radially away from said cathode, a second ring member, said second ring member having a larger diameter than said first ring member and being positioned concentrically with said tubular cathode, said second ring member supporting a second group of vertically positioned electrodes of generally plate-like configuration, at least one of the electrodes of said second group being radially aligned with each of the electrodes of said first group, and at least one electrode of said second group being radially positioned intermediate between each of two adjacent electrodes in said first group, each of said electrodes of said first and second groups comprising a member of electrically conductive material at least partially coated with a coating of resistance material, the resistance of said coating being higher than that of said conductive material but low enough to prevent any appreciable charge accumulation on said control electrode.

21. Apparatus for directly converting thermal energy to electrical energy with an efficiency greater than 50% consisting essentially of a housing, an electron emitting cathode in said housing, an anode in said housing spaced from said cathode, means for applying thermal energy to said cathode, a control electrode between said cathode and anode for producing a potential field gradient to accelerate a major portion of the electrons emitted from the cathode to said anode when a positive external potential of predetermined value is applied to said control electrode and without an external potential applied to said anode, passive power absorbing means only connected to said anode, and means connected to said control electrode for applying a positive potential of said predetermined value to said control electrode to produce a transfer of electrical energy to said passive power absorbing means equal to substantially more than 50% of the thermal energy applied to said cathode by said thermal energy applying means.

References Cited in the file of this patent
UNITED STATES PATENTS 2,437,576     Wick _____ Mar. 9, 1948
2,881,384     Durant _____ Apr. 7, 1959